3,361,753
CERTAIN 9-(3-PYRIDYL)THIOXANTHENE AND THIOXANTHOL DERIVATIVES
Eriks Krumkalns, Indianapolis, Ind., assignor to Eli Lilly and Company, Indianapolis, Ind., a corporation of Indiana
No Drawing. Original application Feb. 17, 1966, Ser. No. 528,101, now Patent No. 3,335,148, dated Aug. 8, 1967. Divided and this application Feb. 24, 1967, Ser. No. 618,331
2 Claims. (Cl. 260—294.8)

ABSTRACT OF THE DISCLOSURE 9-(3-pyridyl)-9-xanthol is prepared via reaction of 9-thioxanthone with 3-pyridyllithium and is converted into 9-(3-pyridyl)-9-xanthene by hydriodic acid reduction. The products are useful for controlling fungi which attack food crops, ornamental plants, and turf.

---

This application is a division of my earlier application, Ser. No. 528,101, filed Feb. 17, 1966, now Patent No. 3,335,148.

Background of the invention

Food crops, ornamental plants and turf are all subject to attack by many kinds of fungi and are seriously damaged thereby. A great deal of time and effort has been spent to find substances with which to combat such fungi.

In the prior art, McCarty et al., J. Am. Chem. Soc., 79, 472–80 (1957), teach that 9-(2-pyridyl)-9-thioxanthol is useful as a synthetic intermediate in the preparation of 9-(2-piperidyl)-9-thioxanthol, which is said to possess central stimulant activity.

The present invention relates to certain 3-pyridyl analogues, which possess unexpected fungicidal activity.

Summary

This invention relates to certain 3-pyridyl xanthane compounds and the nonphytotoxic acid addition salts thereof. More particularly, the invention relates to compounds of the formula:

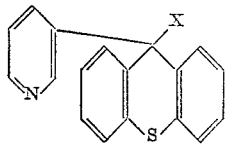

(I)

wherein:

X is hydrogen or hydroxyl; and
The nonphytotoxic acid addition salts thereof.

Suitable nonphytotoxic acid addition salts of the bases represented by the above formula can be prepared employing, for example, the following acids: hydrochloric, hydrobromic, sulfuric, phosphoric, nitric, oxalic, methanesulfonic, p-toluenesulfonic, maleic, and the like.

The novel compounds of this invention have useful antifungal and antibacterial properties and have been found useful in controlling fungi which attack food crops, ornamental plants, and turf.

The novel 9-substituted 9-thioxanthols (X=OH in Formula I) are readily prepared by the following synthesis, which makes them available in good yields. The synthesis is carried out by allowing 3-pyridyllithium (prepared from 3-bromopyridine and n-butyllithium) to react with 9-thioxanthone, in a suitable solvent such as ether under an atmosphere of dry nitrogen, at a temperature of about —40° to about —75° C. for about two hours. The cooling bath is removed and the mixture allowed to warm to ambient room temperature overnight. The reaction product mixture is commingled with dilute aqueous acid solution, for example, dilute aqueous hydrochloric acid; and the layers are separated. The aqueous layer is made basic with a strong base such as sodium hydroxide and extracted with ether. The ether extract is dried and concentrated in vacuo to leave a residue, which is recrystallized from a mixture of hot benzene and petroleum ether to yield 9-(3-pyridyl)-9-thioxanthol.

When X=H in Formula I, the novel compounds are prepared by the procedure taught by Sperber et al., U.S. Patent 2,727,895 (Dec. 20, 1955), whereby the 9-substituted 9-thioxanthol as prepared above is heated in a mixture of glacial acetic acid, concentrated hydrochloric acid, and 47 percent aqueous hydriodic acid to reduce the hydroxyl group.

While the compounds of the present invention have been defined in terms of a structural formula which depicts the novel structural features of the claimed compounds and which indicates the presence therein of certain well-known organic radicals, including pyridyl and thioxanthyl, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are chloro, bromo, fluoro, iodo, trifluoromethyl, hydroxy, methyl, ethyl, n-propyl, isopropyl, methoxy, methylmercapto, and the like.

The following example describes in detail one method for preparing the novel compounds of this invention. However the invention is not to be constructed as limited thereby either in spirit or in scope, since it will be apparent to those skilled in the art that many modifications both of materials and methods may be practiced within the purpose and intent of this disclosure.

EXAMPLE

9-(3-pyridyl)-9-thioxanthol

Using a 1-liter round-bottomed, 3-necked reaction flask equipped with mechanical stirrer, dropping funnel, and low temperature thermometer, 3-pyridyllithium was prepared in a dry nitrogen atmosphere from 16 g. (0.1 mole) of 3-bromopyridine and 54 g. (0.13 mole) of a 15 percent solution of n-butyllithium in hexane, using 200 ml. of dry tetrahydrofuran as solvent, while maintaining the reaction temperature below —50° C. with an acetone Dry-Ice bath. To the cold solution was added a solution of 21.2 g. (0.1 mole) of 9-thioxanthone dissolved in 200 ml. of dry tetrahydrofuran, keeping the reaction temperature below about —50° C. by continued cooling with the acetone Dry-Ice bath. After the addition was complete, the reaction mixture was held at —75° C. for another two hours, and then allowed to warm to ambient room temperature overnight.

To the reaction product mixture were added 100 ml. of water and the mixture concentrated to dryness in vacuo. The dry residue was dissolved in benzene and extracted with 400 ml. of 1N aqueous hydrochloric acid. The acid extracts were combined, made basic with concentrated aqueous sodium hydroxide solution, and extracted with about 450 ml. of benzene. The benzene extracts were combined and filtered, and petroleum ether was added to the point of incipient crystallization. The crystalline product which separated was filtered off and recrystallized from a mixture of hot benzene and petroleum ether. The crystalline product had a melting point of 204° C. and was identified by infrared spectrum and elemental analysis as 9-(3-pyridyl)-9-thioxanthol, wt., 4 g.

The thioxanthol is reduced to the 9-substituted thioxanthene by the procedure of Sperber et al., U.S. Patent 2,727,895 (Dec. 20, 1955).

I claim:
1. A compound of the formula:

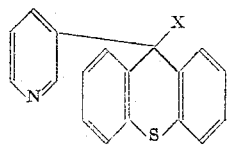

wherein:
   X is hydrogen or hydroxyl; and
   a nonphytotoxic acid addition salt thereof.
2. A compound as in claim 1, said compound being 9-(3-pyridyl)-9-thioxanthol.

References Cited
McCarthy et al., J. Am. Chem. Soc., vol. 79, pp. 472–480 (1957).

JOHN D. RANDOLPH, *Primary Examiner.*

A. L. ROTMAN, *Assistant Examiner.*

Disclaimer and Dedication

3,361,753.—*Eriks Krumkalns*, Indianapolis, Ind. CERTAIN 9-(3-PYRIDYL) THIOXANTHENE AND THIOXANTHOL DERIVATIVES. Patent dated Jan. 2, 1968. Disclaimer and dedication filed May 18, 1972, by the assignee, *Eli Lilly and Company*.

Hereby disclaims claims 1 and 2, all the claims of said patent, and dedicates to the Public the remaining term of said patent.

[*Official Gazette August 29, 1972.*]